(12) United States Patent
LaFlamme et al.

(10) Patent No.: US 10,259,645 B2
(45) Date of Patent: Apr. 16, 2019

(54) ADJUSTABLE DOSING FLUID DISPENSER FOR FLEXIBLE FLUID PACKAGES

(71) Applicant: InnovationCooperative3D, LLC, Farmington, CT (US)

(72) Inventors: Roger J. LaFlamme, Sturbridge, MA (US); Jim Warner, Chicago, IL (US)

( * ) Notice: Subject to any disclaimer, the term of this patent is extended or adjusted under 35 U.S.C. 154(b) by 0 days.

(21) Appl. No.: 15/499,482

(22) Filed: Apr. 27, 2017

(65) Prior Publication Data
US 2017/0334632 A1 Nov. 23, 2017

Related U.S. Application Data

(60) Provisional application No. 62/328,120, filed on Apr. 27, 2016.

(51) Int. Cl.
| | | |
|---|---|---|
| *B65D 83/52* | (2006.01) | |
| *B65D 35/08* | (2006.01) | |
| *B65D 35/40* | (2006.01) | |
| *B67D 1/08* | (2006.01) | |
| *B65D 83/00* | (2006.01) | |
| *G01F 11/00* | (2006.01) | |
| *G01F 11/28* | (2006.01) | |
| *G01F 11/44* | (2006.01) | |
| *B05B 11/00* | (2006.01) | |

(52) U.S. Cl.
CPC ........ *B65D 83/525* (2013.01); *B05B 11/3028* (2013.01); *B65D 35/08* (2013.01); *B65D 35/40* (2013.01); *B65D 83/0055* (2013.01); *B67D 1/08* (2013.01); *G01F 11/006* (2013.01); *G01F 11/288* (2013.01); *G01F 11/44* (2013.01); *B05B 11/0037* (2013.01); *B05B 11/0041* (2018.08); *B05B 11/00412* (2018.08)

(58) Field of Classification Search
CPC .. B65D 83/525; B65D 83/0055; B65D 35/08; B65D 35/40; B05B 11/3028; B05B 11/288; B05B 11/40412; B05B 11/4041; B05B 11/0037; G01F 11/288; G01F 11/44; G01F 11/006; B67D 1/08
USPC ....... 222/212–215, 207, 282, 286, 309, 383, 222/387, 162, 163
See application file for complete search history.

(56) References Cited

U.S. PATENT DOCUMENTS

| | | | |
|---|---|---|---|
| 6,216,916 B1 * | 4/2001 | Maddox ............... | A47K 5/1207 222/105 |
| 7,806,301 B1 * | 10/2010 | Ciavarella ........... | B05B 11/3033 222/181.3 |
| 8,132,696 B2 | 3/2012 | Mileti | |

(Continued)

OTHER PUBLICATIONS

International Search Report issued in co-pending International Application No. PCT/US2017/029895 dated Aug. 3, 2017.

*Primary Examiner* — Lien Ngo
(74) *Attorney, Agent, or Firm* — Whiteford, Taylor & Preston, LLP; Peter J. Davis

(57) ABSTRACT

A device for dispensing fluid from a fluid container, the device capable of being set to different discrete and repeatable/equal dispensing amounts, depending on the amount of fluid required to be dispensed by the user for various applications and uses. The device may also be set to an "off" or "closed" position to prevent accidental dispensing of fluid when not in use. The device is preferably configured to be affixed to the outer surface of a fluid container, which fluid container is preferably a flexible bag or pouch.

10 Claims, 16 Drawing Sheets

(56) References Cited

U.S. PATENT DOCUMENTS

| | | | |
|---|---|---|---|
| 8,292,120 B2 | 10/2012 | LaFlamme et al. | |
| 8,544,684 B2 | 10/2013 | Perez | |
| 9,060,655 B2 * | 6/2015 | Iseri | A47K 5/1211 |
| 9,241,828 B2 * | 1/2016 | Pardes | A61F 9/0008 |
| 9,788,634 B2 * | 10/2017 | Wang | A45D 40/0075 |
| 9,950,330 B2 * | 4/2018 | Smith | B05B 11/303 |
| 2007/0158364 A1 * | 7/2007 | Drennow | B67D 1/0082 |
| | | | 222/207 |
| 2011/0248049 A1 | 10/2011 | Mileti | |
| 2012/0118915 A1 | 5/2012 | Harper | |

* cited by examiner

ADJUSTABLE DOSING FLUID DISPENSER FOR FLEXIBLE FLUID PACKAGES

BACKGROUND OF THE INVENTION

Field of the Invention

This invention relates generally to dispensing devices and packages. More specifically, the present invention relates to metering devices that can controllably dispense fluid media from a source of fluid media.

Description of the Background

Various types of fluid material and media are employed for different purposes through commerce and industry. For example, there are various products in the personal care, home care, air care, Medical, transportation, and food industries that require some type of dispensing of a fluid material from a source of such material. When this material is sold in commerce, it must be contained and stored in some type of container. When that product is used, it must be dispensed from its storage container to a location for use.

In the prior art, there are many different types of dispensers for delivering fluid material. For example, a flexible container body with a nozzle tip is commonly provided for such a purpose. An application of such use is for the dispensing of ketchup where the container body is squeezed by the user to urge the fluid material out from the nozzle tip to a desired location. The amount of fluid delivered is determined by the how much the user squeezes the container body. However, this yields erratic results where more or less fluid material is delivered on each successive squeeze of the container body. Also, the container must be held upright when not in use to avoid leakage because no valves are employed.

In another example of a prior art dispensing device, a flexible container holds a volume of fluid material to be delivered. A single one-way check valve is provided as an exit port from the flexible container. When the flexible body is squeezed, the material is urged out under pressure through the valve.

SUMMARY OF THE INVENTION

The fluid dispensing devices of the prior art suffer from various disadvantages that make them difficult and awkward to use with unexpected results. Therefore, there is a need for a fluid dispenser that is easy to operate and provides the end user with a customized dosage that they can select. There is a further need for a fluid dispenser that is capable of delivering a metered dose of fluid with an expected flow upon each dispensing operation for better application of the fluid material. There is also a need for a dispenser that is gravity independent. There is an additional need for the fluid to be capable of being delivered from any point on the surface of container. There is a further need for a dispenser to include an applicator material for even distribution and even application of the fluid material, as desired.

The present invention preserves the advantages of prior art dispensing devices, overcomes many disadvantages of such currently available devices, and provides new advantages not found in currently available devices.

The invention is generally directed to a novel and unique dispenser for delivering a customizable metered dose of fluid material upon each dispensing operation with an optional applicator for even distribution of the dispensed fluid material.

The fluid dispensing system according to the invention includes a fluid container and a fluid dispensing device affixed to the surface of the fluid container. The fluid dispensing device preferably includes a metering housing (sometimes referred to herein as a dosing/control collar or base unit), a flexible dosing dome, and a combined metering dial and dosing button (sometimes referred to herein as metering dial/dosing button or dial/button). The metering housing is configured to receive the flexible dosing dome and the metering dial/dosing button in a nested fashion, and a dose chamber (also referred to herein as pump chamber) is formed between the flexible dosing dome and the inside bottom surface of the metering housing. An opening is formed in the bottom surface of the metering housing to serve as a fluid inlet to permit the entry of fluid from the fluid container into the dose chamber. An inlet valve may be positioned inside the dose chamber above the opening/fluid inlet to prevent fluid that has entered the dose chamber from returning to the fluid container. A fluid delivery channel is formed in the metering housing between the dose chamber and the outside surface of the metering housing to permit the delivery of fluid from the dose chamber to the desired application point. According to a preferred embodiment, an outlet valve may be placed in the channel or at either end of the channel to prevent the return of fluid in the fluid delivery channel to the dose chamber. The metering housing and the metering dial/dosing button are configured with a plurality of nubs and channels/slots that interact with one-another to constrain the relative movement of the dial/button and the housing in a predetermined ways, both rotationally, and horizontally. The interplay between the nubs and slots permit the dial/button to be "locked" in such a way that prevents the dispensing of fluid, and, when the dial/button is rotated to any one of two or more discrete positions, it allows the dispensing of different discrete amounts of fluids. When the dial/button is in one of the dispensing positions and the dial/button is pressed and then released, fluid from the inside of the fluid container is drawn into the dosing chamber via the fluid inlet opening by vacuum action caused by the return of the flexible dosing dome to its original shape after having been deformed by pressing of the metering dial/dosing button. The amount of fluid drawn into the dosing chamber depends on how far the dial/button is depressed, and the distance that the dial/button is depressed is controlled by the depth of the dose control slot corresponding to the dose selected by the user by rotation of the dial/button. If, when the dial/button is depressed, fluid is already present in the dosing chamber, that fluid is forced out through the fluid delivery channel via the outlet valve, prevented from returning to the fluid container by action of the inlet valve. As with the amount of fluid that enters the dosing chamber when the dial/button is released, the amount that is forced out of the dosing chamber into the fluid delivery channel corresponds to the distance that the dial/button is depressed, which is controlled by the depth of the dose control slot/channel corresponding to the dose selected by the user by rotation of the dial/button.

According to an alternate embodiment, the dial/button may be provided in two or more parts for ease of manufacture. According to one such alternate embodiment, the dial/button may comprise a first part including the inner column, and a second part including the outer column and the base. According to this embodiment, the flexible dosing dome may be sealed to the first part, and the first part, with the flexible dosing dome, may then be sealed to the second part.

According to a further embodiment of the invention, the dosing slots may be provided with downward facing teeth or prongs which prevent the nub that is traveling in the slots, and hence the dial/button, from moving upward until a full depression has been accomplished. This embodiment is useful in applications where precise dosing is important and incomplete dosing is to be avoided. According to a further embodiment, one or more return slots may be provided to allow the dosing dial/button to return to its resting state under force of the flexible dosing dome returning to its original shape, pulling a new volume of fluid into the dosing chamber from the fluid container by vacuum action. According to this embodiment, the return slot may be provided with upward facing teeth or prongs to prevent depression of the dial/button when it is returning to the rest position (i.e., to prevent the return slot from being used as a dose slot) and to ensure that a complete new dose is drawn into the dosing chamber. According to this embodiment, once the user has administered a full dose, the dial/button may be manually rotated to a return position so that the dial/button can return to the rest position under force of the flexible dosing dome.

It is therefore an object of the present invention to provide a fluid dispensing device that can deliver a user customized equal volume of fluid material from each dispensing operation.

It is an object of the present invention to provide a fluid dispensing device that is insensitive to gravity.

Another object of the present invention is to provide a fluid dispensing device that can deliver fluid flow at any point from the device.

It is a further object of the present invention to provide a fluid dispensing device that can deliver fluid flow at multiple locations from the device.

BRIEF DESCRIPTION OF THE DRAWINGS

The subsequent description of the preferred embodiments of the present invention refers to the attached drawings, wherein:

FIG. 1b is an alternate rendition of the embodiment shown in FIG. 1a.

FIG. 2 is a bottom perspective view of the dosing/control collar shown in FIG. 1a.

FIG. 3 is a cross-sectional view of the dosing/control collar shown in FIG. 1a.

FIG. 5b is an alternate rendition of the embodiment shown in FIG. 5a.

FIG. 6b is an alternate rendition of the embodiment shown in FIG. 6a.

FIG. 7b is an alternate rendition of the embodiment shown in FIG. 7a.

FIG. 8b is an alternate rendition of the embodiment shown in FIG. 8a.

FIG. 9b is an alternate rendition of the embodiment shown in FIG. 9a.

FIG. 10b is an alternate rendition of the embodiment shown in FIG. 10a.

FIG. 11b is an alternate rendition of the embodiment shown in FIG. 11a.

FIG. 12b is an alternate rendition of the embodiment shown in FIG. 12a.

FIG. 13b is an alternate rendition of the embodiment shown in FIG. 13a.

FIG. 14b is an alternate rendition of the embodiment shown in FIG. 14a.

FIG. 15b is an alternate rendition of the embodiment shown in FIG. 15a.

DETAILED DESCRIPTION OF THE INVENTION

The present invention is a device for dispensing fluid from a fluid container, the device capable of being set to different discrete and repeatable/equal dispensing amounts, depending on the amount of fluid required to be dispensed by the user for various applications and uses. The device may also be set to an "off" or "closed" position to prevent accidental dispensing of fluid when not in use. The device is preferably configured to be affixed to the outer surface of a fluid container, which fluid container is preferably a flexible bag or pouch. According to various embodiments, at least one surface of the fluid container or a sufficient portion of the fluid container is flexible to allow the container to collapse as fluid is withdrawn therefrom. In the case that the entire fluid container is not made of flexible material, the dispensing device is preferably attached to portion of the container that is flexible and which is collapsible as fluid is dispensed from the container.

Figure 1A:
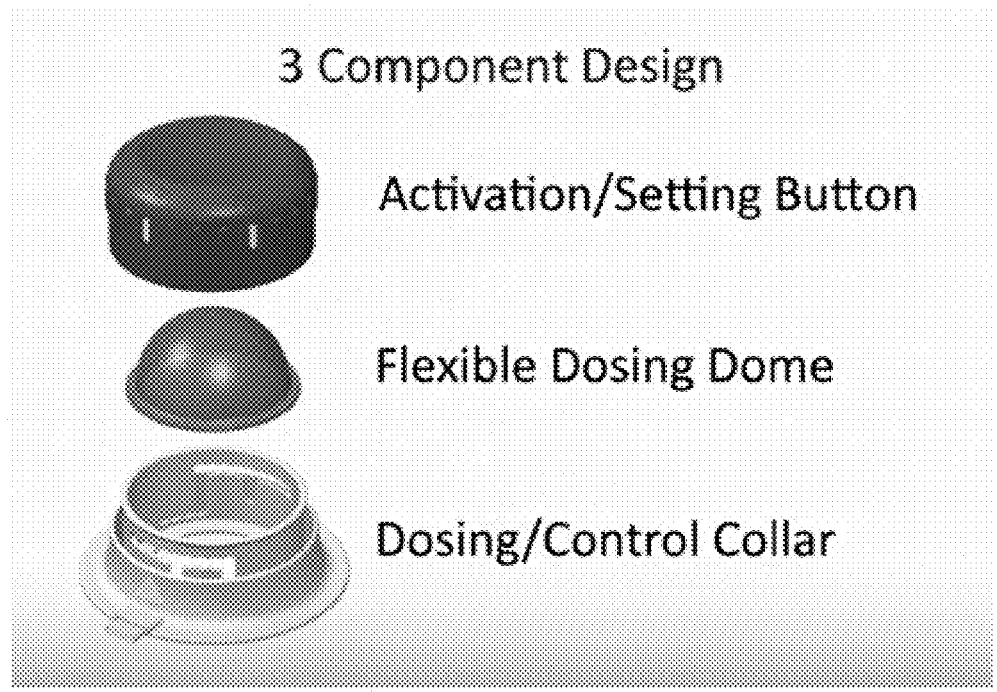
FIG. 1a is an exploded perspective view of an adjustable fluid dosing dispenser according to an embodiment of the invention.
Figure 1B:
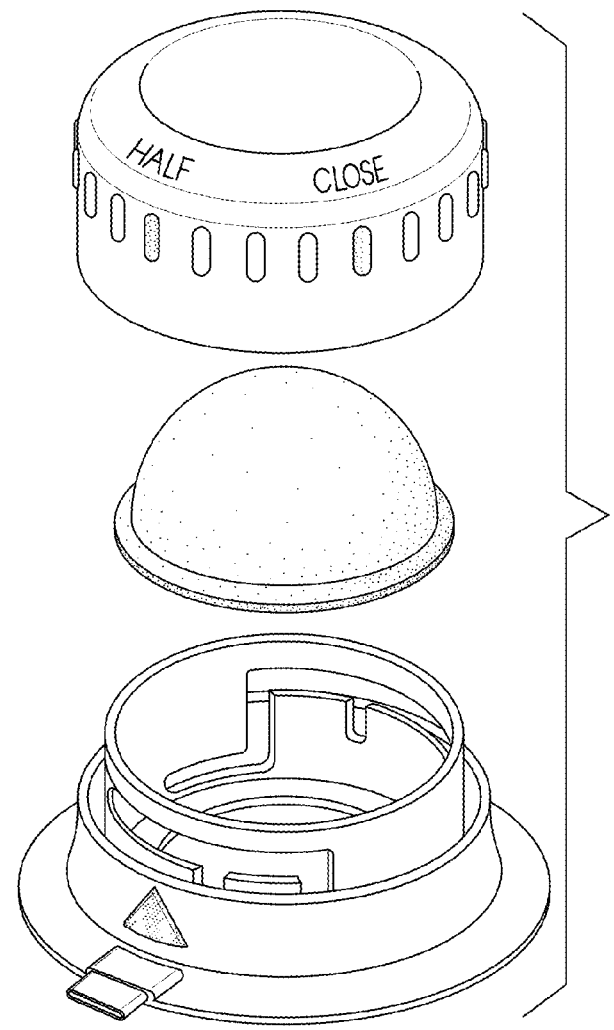
Figure 1C:
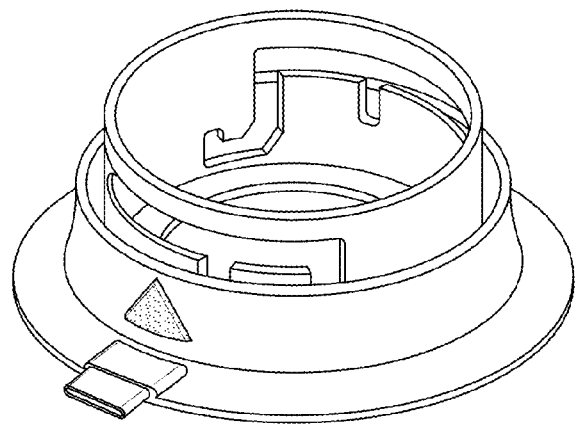
FIG. 1c is a perspective view of an adjustable fluid dosing dispenser dosing collar with an alternative slot design.
Figure 1D:
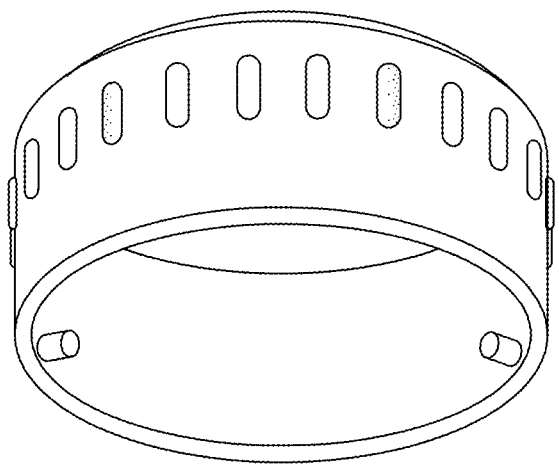
FIG. 1d is a bottom perspective view of the dosing dial/button.
Figure 2:
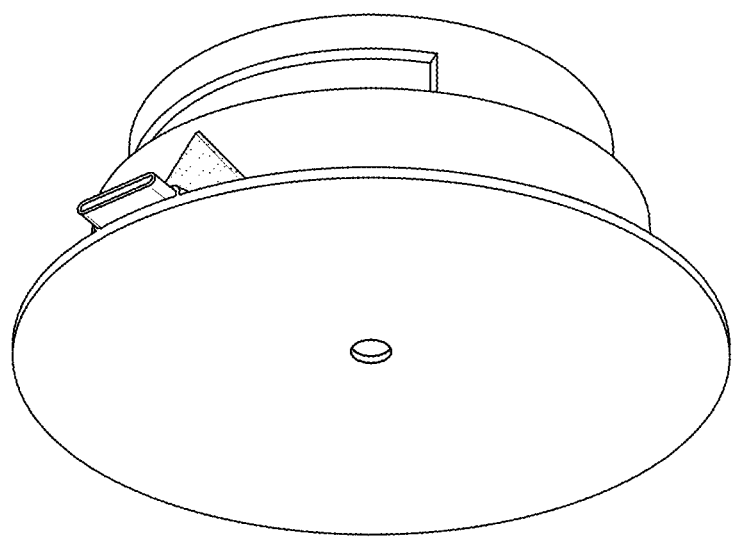

FIGS. 1a-1c show an embodiment of the device including a dosing/control collar, a flexible dosing dome, and a combined dose setting dial and dose delivery button. The flexible dosing dome and the dosing/control collar, when assembled, form the pump or dosing chamber. The dosing/control collar is preferably cylindrical in shape with concentric inner and outer annular shafts/columns rising from a common base and defining a narrow channel between them. The exterior of the outer annular shaft may feature a flange that extends away from the center of the shaft. The interior shaft also features a plurality of horizontal and vertical dosing and rotation channels or slots that receive and interact with corresponding nubs on the outside surface of the dose dial/button. According to an alternative embodiment, the dosing and rotation channels may be on the shaft of the dose dial/button and the nubs may be on the outside surface of the inner annular shaft. The horizontal slots are the rotation slots and may have a plurality of détente locations so that the user can tactilely feel the progress of the dial as it is being rotated. The vertical channels are the dosing slots and have differing depths (measured from the horizontal slot to the bottom of the vertical slot) which correspond to different dispensing amounts. According to a preferred embodiment, each vertical slot in the inner annular shaft is paired with a second vertical slot of the same depth, spaced apart on the inner annular shaft, and each nub on the dose dial button is paired with a second nub spaced apart on the dose/dial button at a location that corresponds to the location of the second vertical shaft. When the dial/button is rotated so that a nub on the exterior of the dial/button lines up with a vertical slot, the button can be depressed to dispense fluid. The limit of depression limits the amount dispensed, and the depth of the vertical slot limits how far the button can be depressed because when the nub hits the bottom of the vertical slot, the dial/button is prevented from being depressed any further without breaking the nub, the slot/channel, or both.

According to one embodiment, there is at least one vertical slot or set of vertical slots for a "Full" dose, and there is at least one second vertical slot or set of vertical slots for a "Half" or "Partial" does. According to other embodiments, there may be a third and fourth vertical slots or sets of vertical slots for other fractional doses, for example, ¾ dose, ⅔ dose, ⅓ dose and ¼ dose.

Figure 3:
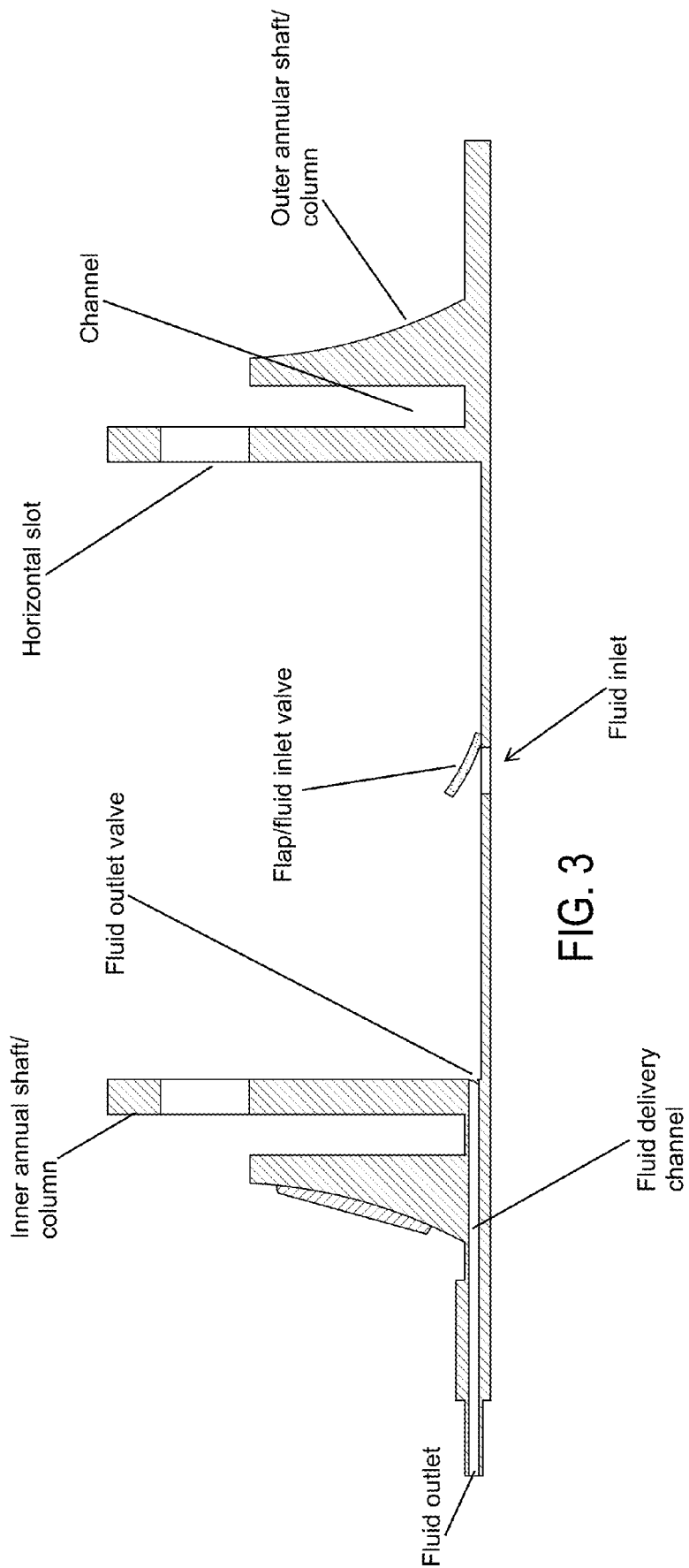

The dosing control collar also features a through-opening in the bottom surface to accommodate the entry of fluid, fluid inlet valve, represented in FIG. 3 as a flexible flap that is configured to lie over the through-opening, a fluid outlet on the outside surface of the dosing control collar, and a fluid delivery channel between said fluid inlet and said fluid outlet.

Figure 4:
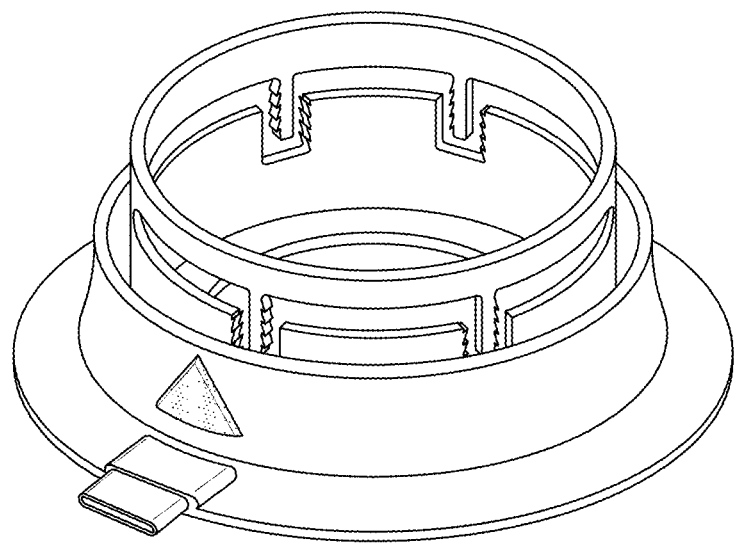
FIG. 4 is a perspective view of a dosing/control collar according to a further alternative embodiment of the invention.

According to a further alternative embodiment shown in FIG. 4, the dosing control collar may have separate dosing slots and return slots. According to this embodiment, the dosing slots may have downward facing teeth or prongs which prevent the nubs from traveling upwards, thus requiring that the dial/button be fully depressed before it returns to the set position. Since the nubs cannot travel upwards in the dosing slots, separate return slots are provided adjacent the dosing slots, connected by a horizontal slot. The return slots preferably have upward facing teeth or prongs to prevent the nubs from traveling downward while in the return slots.

The dose setting dial/dose delivery button is preferably manufactured of relatively rigid plastic having a rigid bottom portion that snaps into the channel formed between the inner and outer annular shafts of the base (dosing/control collar).

The dose setting dial/dose delivery button and the dosing/control collar are preferably made of a rigid plastic material. A non-limiting example of a material that may be used for the dose setting dial/dose delivery button and the dosing/control collar is shown in Appendix 1. Numerous other materials would likewise be suitable as persons of ordinary skill in the art would appreciate. Appendix 1 is provided only to provide a reference point for the general properties of the materials that are suitable for the present invention. Nubs molded to or otherwise formed on the interior surface of the dial/button rest inside the slots formed in the interior shaft. When a user presses the dial/button, the dial/button forces the flexible dosing dome downward to evacuate the interior volume of the dome via the fluid outlet; when the dial/button is released, the flexible dosing dome returns to its original shape, forcing the dial/button upward, and drawing fluid into the interior of the dome under vacuum action.

The flexible dosing dome is preferably made of shape memory elastomeric material that returns to its original shape after deformation. A non-limiting example of a material that may be used for the dose setting dial/dose delivery button and the dosing/control collar is shown in Appendix 2. Numerous other materials would likewise be suitable as persons of ordinary skill in the art would appreciate. Appendix 2 is provided only to provide a reference point for the general properties of the materials that are suitable for the present invention.

Figure 5A:
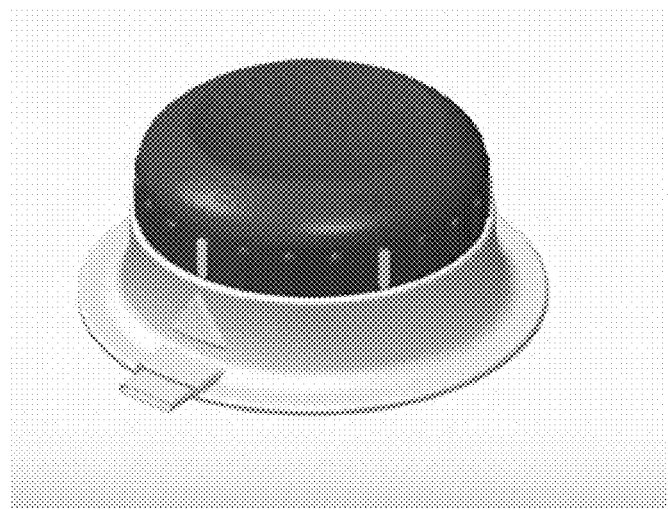
FIG. 5a is a perspective view of an assembled adjustable fluid dosing dispenser according to an embodiment of the invention in a closed/locked position.
Figure 5B:
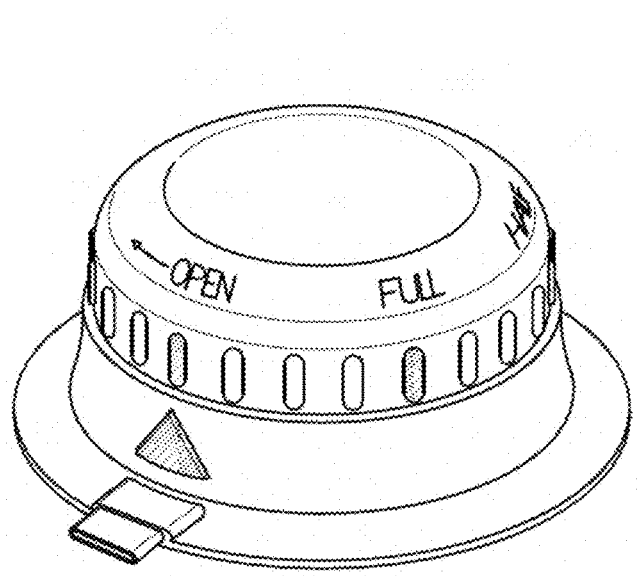

FIGS. 5a and 5b show these three parts assembled into an adjustable fluid dispensing device according to the invention in which the flexible dosing dome is sealed to the base inside the interior column of the dosing/control collar and the bottom portion of the dose setting dial/dose delivery button is snapped over the flexible dosing dome into the channel between the inner and outer shafts. The upper portion of the dial/button projects above the top of the dosing/control collar. According to a preferred embodiment, the perimeter of the upper portion of the dial/button has molded or printed indicia such as "<Open" "Closed" and "FULL" and "HALF" to indicate the rotary position of the dial that corresponds to various functions or dispensing amounts. Each of these indicia corresponds to a nub/slot combination that permits no depression, full depression, half depression, or other partial depression to dispense a corresponding amount of fluid. Likewise, the outside surface of the outer shaft of the collar preferably has printed or molded or other indicia indicating the location on the collar that must be lined up with the appropriate indicia on the dial/button in order to achieve the desired function. In the configuration shown in FIGS. 5a and 5b, the dial/button is in the fully depressed position, and rotated counterclockwise so that the nubs on the inside surface of the dial/button are in the bottom horizontal slot, locking the dial/button into a closed position. According to a preferred embodiment, the bottom horizontal slot has a slight downward slant before becoming horizontal to draw the dial/button down slightly as it is rotated into the closed position, see FIG. 1c, causing the bottom surface of the dial button to bear down on the fluid delivery channel, pinching it shut. As shown in FIGS. 5a and 5b, the indicia on the collar lines up with a "<Open" indicia on the button, showing that in order to dispense fluid, the dial/button must be rotated clockwise until the nubs line up with the "FULL" vertical slot. If the user wishes to dispense only a half dose, the dial/button must be rotated clockwise again until the nubs line up with the correspondingly shorter/shallower vertical channel/slot.

Figure 6A:
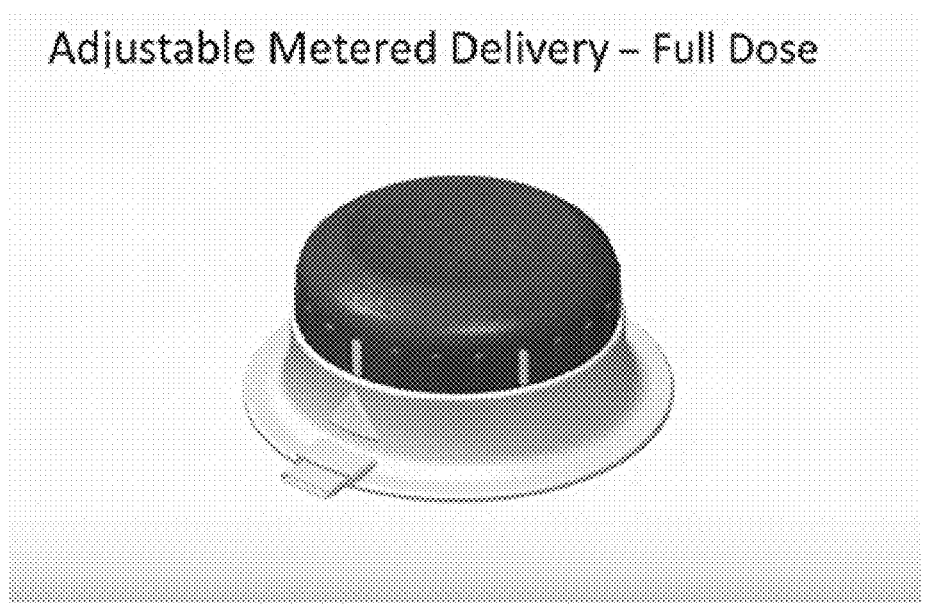
FIG. 6a is a perspective view of an adjustable fluid dosing dispenser according to an embodiment of the invention which has been rotated to the "FULL" dispensing position.
Figure 6B:
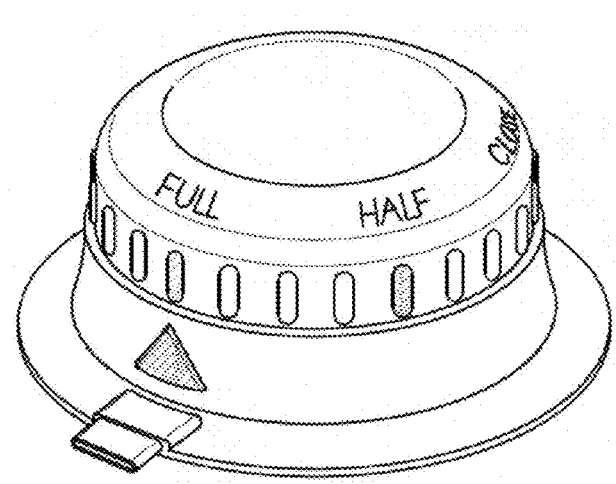

FIGS. 6a and 6b show the dial/button rotated so that the indicia on the collar lines up with the indicia on the button that says "FULL" and the nubs line up with the deepest vertical slot/channel.

Figure 7A:
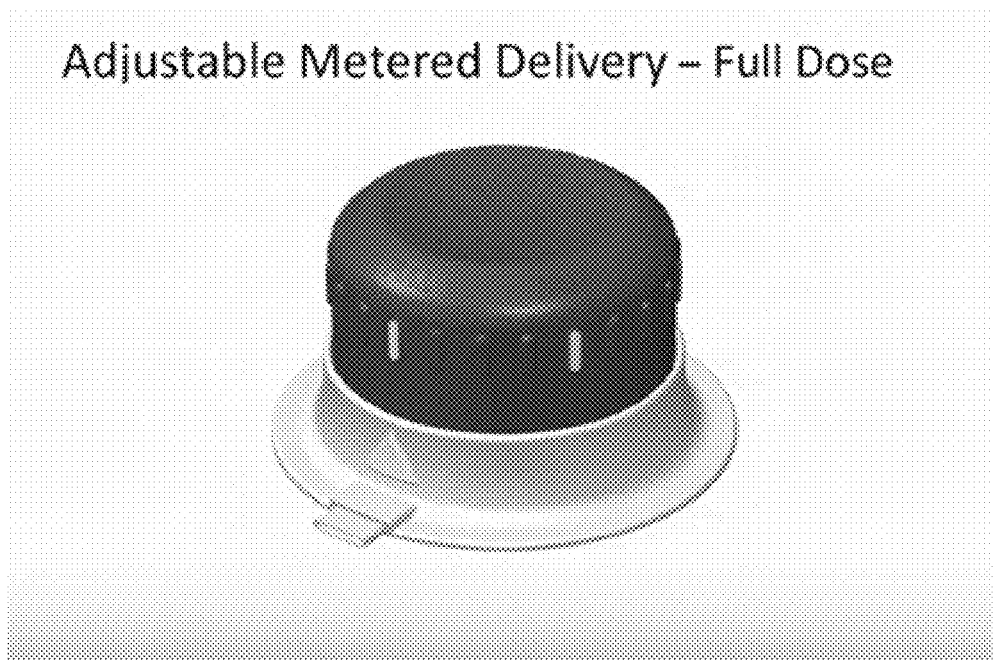
FIG. 7a is a perspective view of an adjustable fluid dosing dispenser according to an embodiment of the invention in which the activation/setting button has been released from the locked position having been rotated to the "FULL" dispensing position and the button forced upward under force of the flexible dome returning to its original position.
Figure 7B:
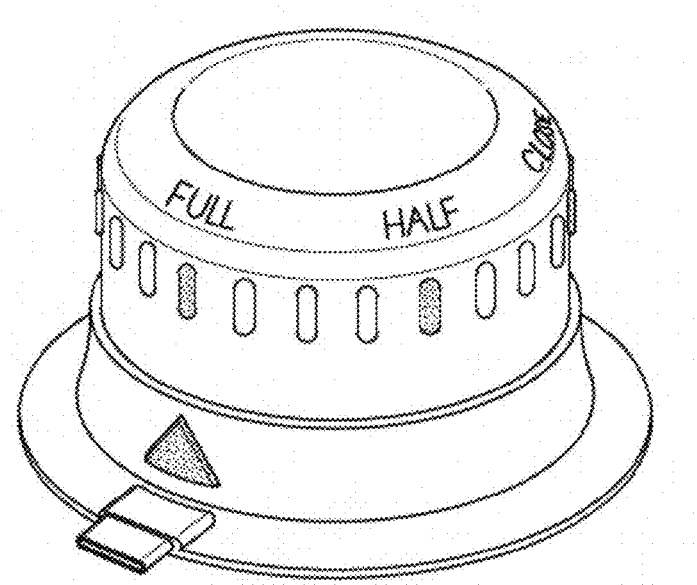

FIGS. 7a and 7b show the dial/button in the same rotational position as in FIG. 3, but after the pressure from the flexible dosing dome has forced the dial/button up to the dispensing position.

Figure 8A:
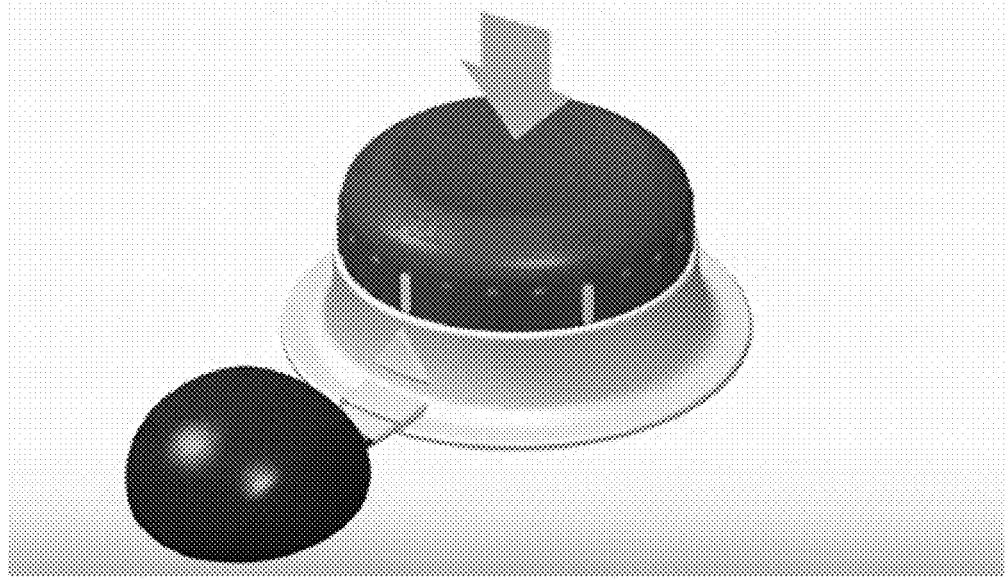
FIG. 8a is a perspective view of an adjustable fluid dosing dispenser according to an embodiment of the invention in which a full dose of liquid is dispensed when the activation/setting button is in the "FULL" position and then manually depressed.
Figure 8B:
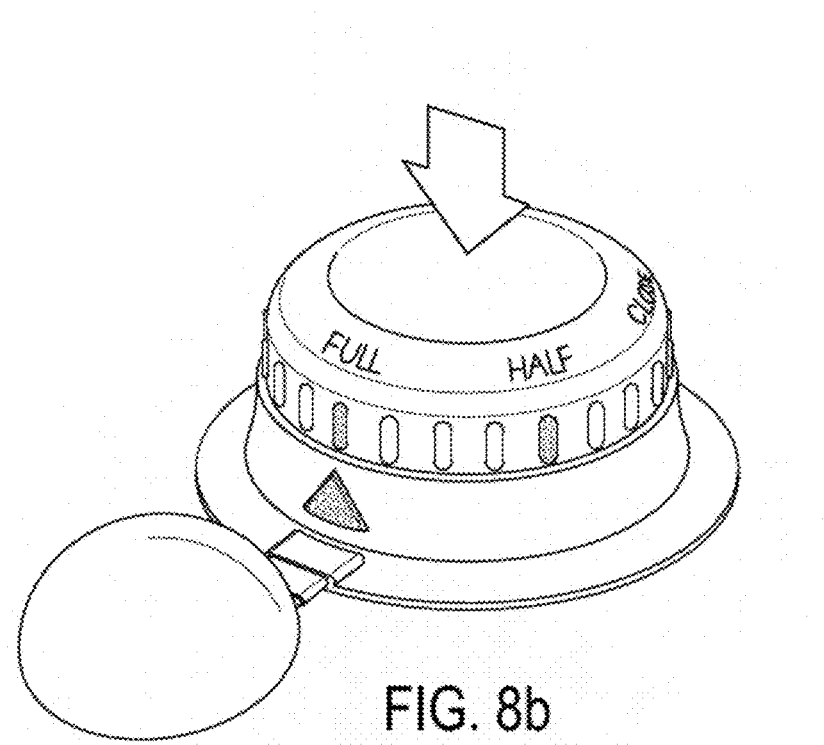
Figure 9A:
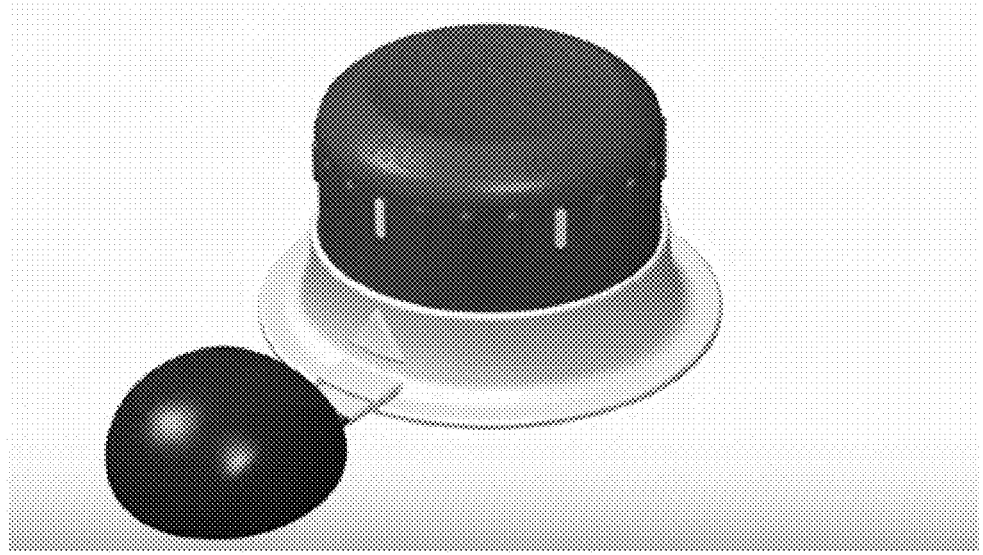
FIG. 9a is a perspective view of an adjustable fluid dosing dispenser according to an embodiment of the invention in which a full dose of liquid has been dispensed upon the manual pressing of the activation/setting button and in which following activation, the button returns to the "ready" position when the button is released and is forced upwards upon action of the flexible dosing dome.
Figure 9B:
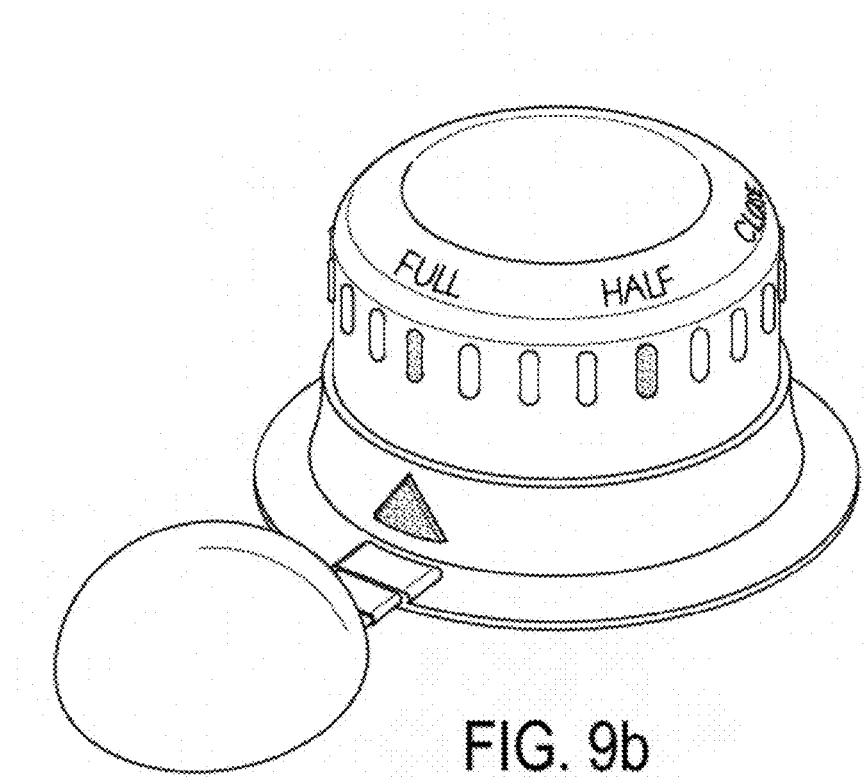

FIGS. 8a and 8b show manual activation of the dial/button in a dispensing action. When the button is depressed, the flexible dosing dome is also depressed. When the button is operated for a first time, the interior volume of the dome may be filled only with air or with air and fluid, if fluid has leaked into the pump chamber from the fluid container during filling, shipping and/or storage. Depression of the button forces the air or air fluid mixture from the interior volume of the dome via the fluid outlet and fluid outlet valve. When the button is released, the flexible dosing dome returns to its original shape, forcing the dial/button back to its original position (FIGS. 9a and 9b), and drawing fluid from the fluid container into the interior volume of the dome via the fluid inlet and fluid inlet valve. Each subsequent depression of the dial/button dispenses fluid forces fluid out of the dosing chamber of the flexible dosing dome out through the fluid outlet via the fluid delivery channel and fluid outlet valve, thus dispensing fluid. When the button is released, the flexible dosing dome again returns to its original shape, drawing a fresh amount of fluid into the dosing chamber.

Figure 10A:
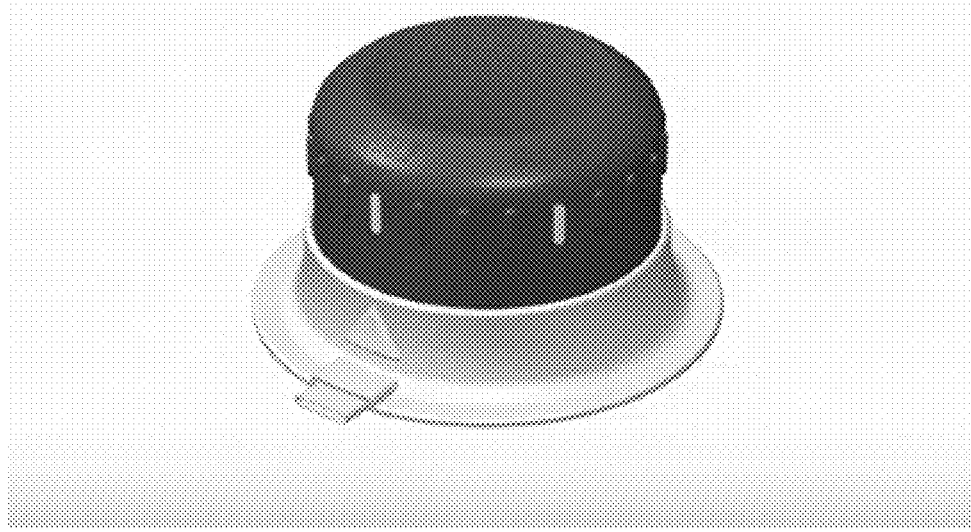
FIG. 10a is a perspective view of an adjustable fluid dosing dispenser according to an embodiment of the invention in which the activation/setting button has been rotated to the half dose position and is in the "ready" position.
Figure 10B:
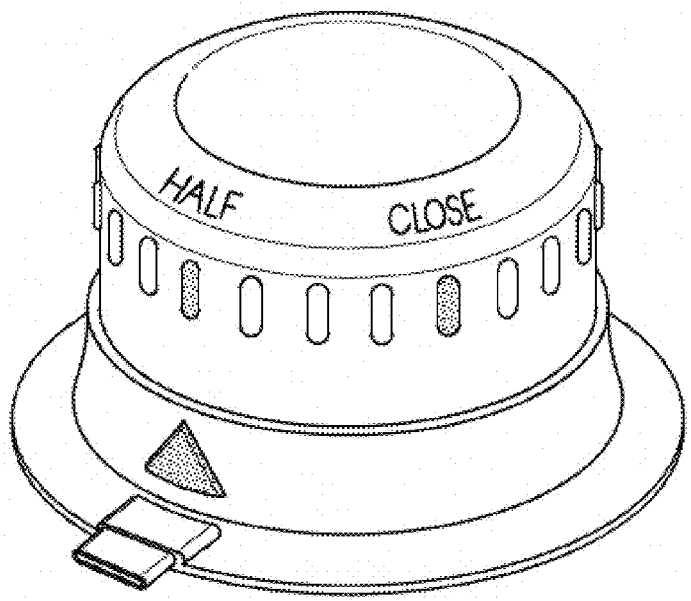

FIGS. 10a and 10b show the dial/button rotated from the "FULL" dispensing location to the "HALF" dispensing location, the nubs in the inside surface of the dial having traveled in the upper horizontal slot/channel from the deep vertical slot/channel to a shallower vertical slot/channel.

Figure 11A:
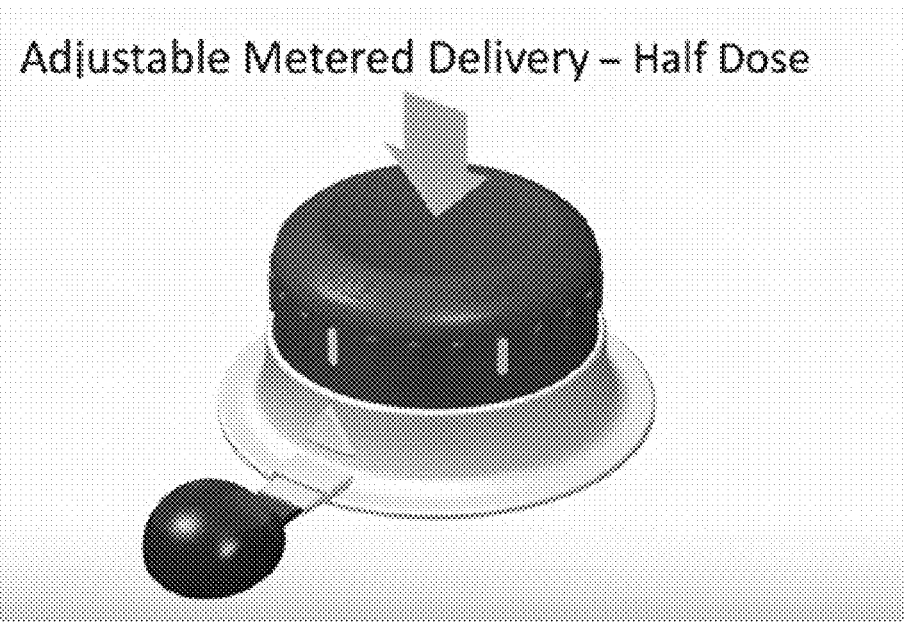
FIG. 11a is a perspective view of an adjustable fluid dosing dispenser according to an embodiment of the invention in which the activation/setting button is in the half dose position and is dispensing a half dose as the activation/setting button is manually depressed by a user.
Figure 11B:
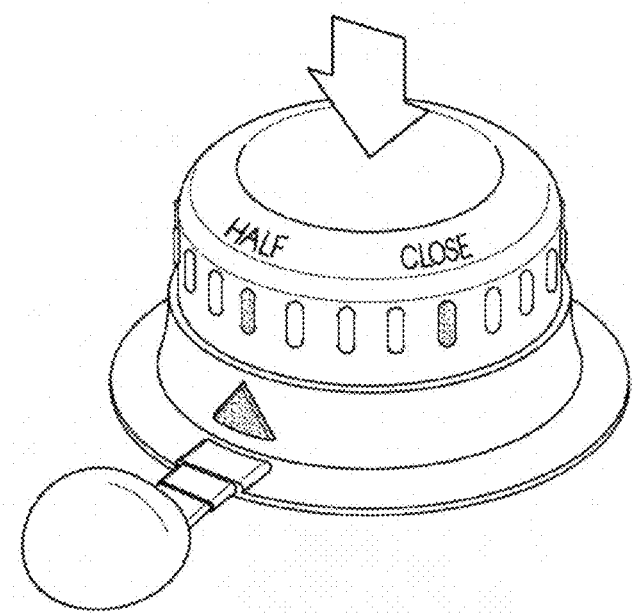

FIGS. 11a and 11b show a complete depression of the dial/button in the "HALF" dispensing location. Note that the button cannot be depressed as far in the "HALF" position as it was in the "FULL" position (FIGS. 8a and 8b) because the nub(s) hit the bottom of the shallower vertical slot(s). FIGS. 11a and 11b show a correspondingly smaller amount dispensed as compared to the FULL dose dispensed in FIGS. 8a and 8b.

Figure 12A:
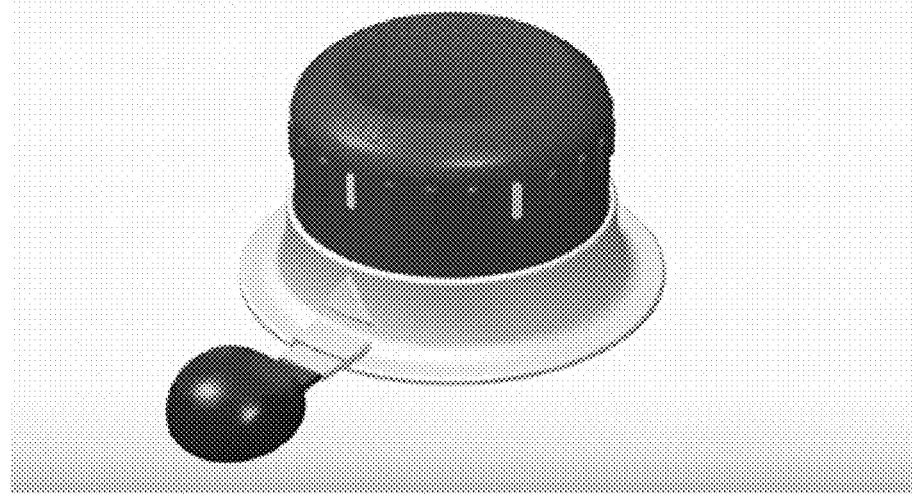
FIG. 12a is a perspective view of an adjustable fluid dosing dispenser according to an embodiment of the invention in which the activation/setting button is in the half dose position, a half dose has been dispensed, and the activation/setting button has returned to the "ready" position having been released by a user and forced upward by the flexible dosing dome.
Figure 12B:
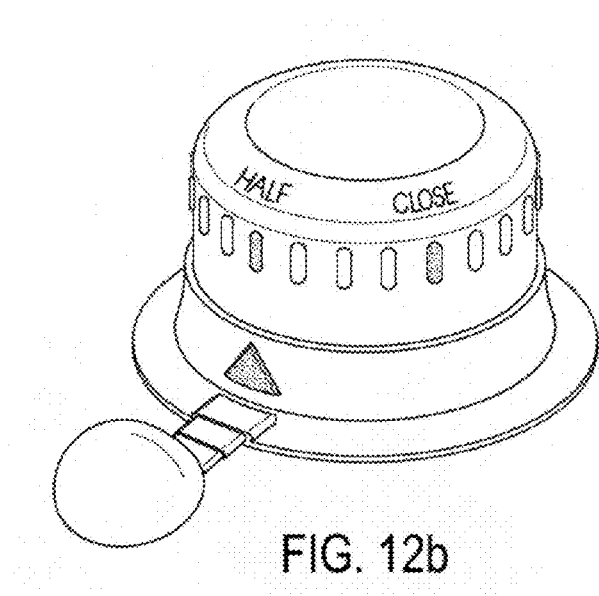

FIGS. 12a and 12b show the dial/button returned to the rest position after it has been released, under the force of the flexible dosing dome which returns to its original shape when not under a load.

Figure 13A:
FIG. 13a is a perspective view of an adjustable fluid dosing dispenser according to an embodiment of the invention in which the activation/setting button has been rotated to a "CLOSE" position.
Figure 13B:
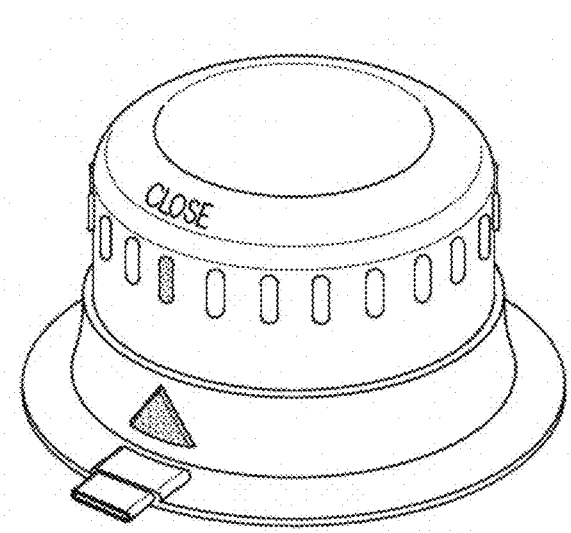

FIGS. 13a and 13b show the dial rotated to an internal product shut off location so that the nub(s)s are in the upper horizontal channel(s)/slot(s), but do not line up with any of the vertical slots. In this location, the button is prevented from accidental activation/dispensing.

Figure 14A:
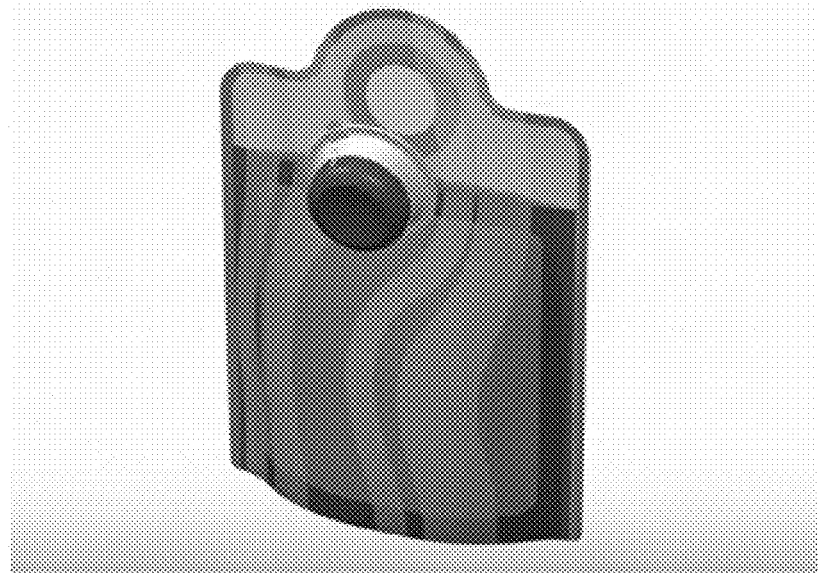
FIG. 14a is a perspective view of an adjustable fluid dosing dispenser according to an embodiment of the invention proximate to a matching opening in a flexible fluid container.
Figure 14B:
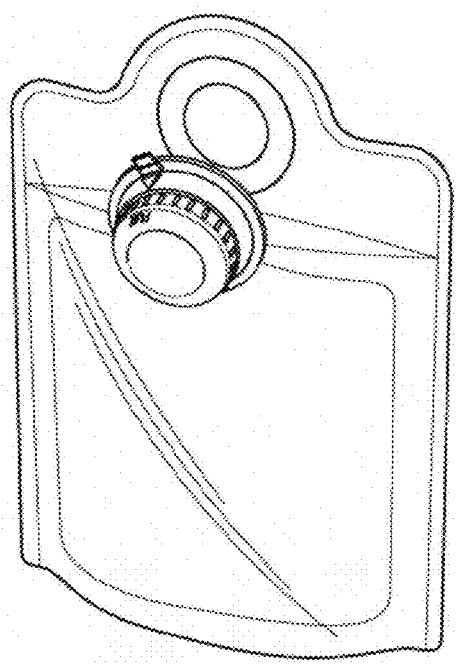

FIGS. 14a and 14b show the adjustable metering device of the invention about to be connected to a flexible fluid container, preferably a bag or pouch. According to a preferred embodiment, the fluid container is collapsible as fluid is dispensed therefrom and preferably contains no air. According to one embodiment, the bottom of the adjustable metering device has an adhesive that makes a secure and air-tight connection to the fluid container. According to a further embodiment, the adhesive may be covered prior to use with a thin pull-away film to protect and preserve the adhesive until it is time to connect the device to the fluid container. According to various alternative embodiments, the bottom of the adjustable metering device may be heat welded to the fluid container, sonic welded to the fluid container or sealed to the fluid container in any other known method. According to a further embodiment, the fluid container may have a reinforced region and/or treated surface that corresponds to the shape and size of the device to facilitate strong and secure connection and prevent container breaking or tearing should a force or load be applied to the device after it has been attached to the fluid container.

Figure 15A:
FIG. 15a is a perspective view of an adjustable fluid dosing dispenser attached to the surface of a flexible fluid container according to an embodiment of the invention.
Figure 15B:
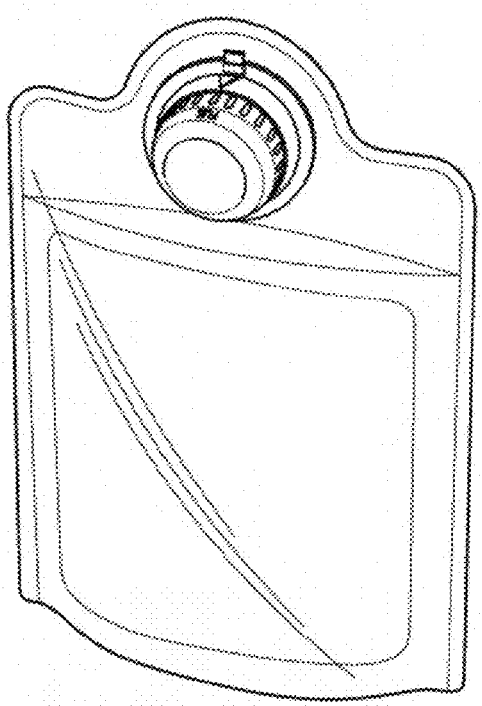

FIGS. 15a and 15b show an adjustable metering device of the invention connected to a flexible fluid container. The device can be operated to dispense fluid no matter the orientation of the device in space, as it is agnostic to gravity or other forces except for the depression of the dial/button.

According to a preferred embodiment, the bottom of the device may be provided with a self-piercing feature that pierces the fluid container at the same time that the device is affixed to the outside of the container, creating fluid communication between the fluid in the container and the fluid inlet of the device with ease and without mess.

The invention claimed is:

1. A fluid dispensing device, comprising: a generally cylindrical rigid base unit having a generally flat and continuous bottom surface and a top surface having concentric inner and outer columns thereon defining a channel therebetween and a center area inside the perimeter of said inner column; a flexible dome manufactured from a shape memory material and configured to fit inside the center area of said base unit to form a pump chamber; said bottom surface of said base unit having a fluid inlet opening to said pump chamber to permit the flow of fluid there-through; said device further comprising a combination dial and button having the shape of a cylinder with a closed top and an open bottom, a bottom portion of said combination dial and button configured to fit inside the channel defined by said two concentric columns; said inner column and a bottom portion of said combination dial and button having complementarily located nubs and slots, the nubs configured to rest in and travel within said slots to constrain the rotational and vertical movement of said combination dial and button in said channel; said base also defining a fluid delivery channel between said pump chamber and a fluid delivery outlet opening on an outside surface of said base unit; said closed top of said combination dial and button being constructed of material that is sufficiently flexible so that upon receiving of a load from above, the top of said combination dial and button can be forced down onto said flexible dome in turn forcing said flexible dome downward, forcing contents of said pump chamber into said fluid delivery channel.

2. The fluid dispensing device according to claim 1, further comprising a uni-directional fluid flow valve associated with said fluid inlet opening to prevent the flow of fluid through said inlet opening when said combination dial and button is being pressed.

3. The fluid dispensing device according to claim 1, further comprising a uni-directional fluid flow valve associated with said fluid delivery channel to prevent flow of fluid into said pump chamber by way of vacuum force when said flexible dome has been depressed and is returning to an original shape due to shape memory.

4. The fluid dispensing device according to claim 1, where said nubs are situated on an inside surface of said combination dial and button, and where said slots are situated on said inner column.

5. The fluid dispensing device according to claim 1, where said nubs are situated on an inside surface of said inner column, and where said slots are in said combination dial and button.

6. The fluid dispensing device according to claim 1, wherein said slots comprise a first vertical slot and a second vertical slot connected at a top end of said first and second vertical slots by a horizontal slot, said first slot having a height that is different from a height of said second slot, said height being measured from said horizontal slot.

7. The fluid dispensing device according to claim 6 further comprising a second horizontal slot, said second horizontal slot connected at a bottom of one of said first and second slots.

8. The fluid dispensing device according to claim 6, further comprising a downward slanting slot connected at a bottom of one of said first and second slots, said downward sloping slot terminating at a second horizontal slot.

9. The fluid dispensing device according to claim 8, having a configuration such that when a nub has been delivered to said second horizontal slot by pressing and rotating of said combination dial and button, a bottom surface of said combination dial and button is drawn down on to a bottom of said channel, causing said fluid delivery channel to be pinched shut.

10. The fluid dispensing device according to claim 1, said channels comprising a plurality of vertical dosing channels having downward facing prongs that prevent upward movement of the nubs in said dosing channels, each of said vertical dosing channels connected at a bottom to an associated vertical return channel having upward facing prongs that inhibit downward movement of the nubs in said vertical return channels.

* * * * *